US009607237B2

(12) United States Patent
Wada et al.

(10) Patent No.: US 9,607,237 B2
(45) Date of Patent: Mar. 28, 2017

(54) IMAGE PROCESSING APPARATUS AND IMAGE PROCESSING METHOD

(71) Applicant: OMRON Corporation, Kyoto (JP)

(72) Inventors: Hirotaka Wada, Nara (JP); Tomoyoshi Aizawa, Kyoto (JP); Norikazu Tonogai, Nara (JP); Tadashi Hyuga, Hirakata (JP); Yoshihisa Minato, Kyoto (JP); Masamichi Oe, Yawata (JP); Koji Kobayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/892,368

(22) PCT Filed: Feb. 27, 2014

(86) PCT No.: PCT/JP2014/054968
§ 371 (c)(1),
(2) Date: Nov. 19, 2015

(87) PCT Pub. No.: WO2014/188753
PCT Pub. Date: Nov. 27, 2014

(65) Prior Publication Data
US 2016/0092745 A1 Mar. 31, 2016

(30) Foreign Application Priority Data
May 20, 2013 (JP) .................................. 2013-106439

(51) Int. Cl.
*G06K 9/34* (2006.01)
*G06K 9/32* (2006.01)
(Continued)

(52) U.S. Cl.
CPC ........... *G06K 9/344* (2013.01); *G06K 9/3283* (2013.01); *G06K 9/6202* (2013.01);
(Continued)

(58) Field of Classification Search
CPC .... G06K 9/344; G06K 9/6202; G06K 9/6215; G06K 9/34; G06K 9/3283;
(Continued)

(56) References Cited

U.S. PATENT DOCUMENTS 4,850,025 A * 7/1989 Abe ....................... G06K 9/348
382/177
5,566,252 A * 10/1996 Miyaza .................. G03G 15/50
382/177
(Continued)

FOREIGN PATENT DOCUMENTS

JP H01-296393 A 11/1989
JP H08-044819 A 2/1996
(Continued)

OTHER PUBLICATIONS

International Search Report issued in corresponding application No. PCT/JP2014/054968 mailed Apr. 28, 2014 (3 pages).

*Primary Examiner* — Kanjibhai Patel
(74) *Attorney, Agent, or Firm* — Osha Liang LLP

(57) ABSTRACT

When there is a possibility that a third character region is redundantly selected in both a case where the line extraction process is performed starting from a first character region and a case where the line extraction process is performed starting from a second character region located in a line different from a line containing the first character region, the line recognition unit determines which line to incorporate the third character region in, by comparing a case of incorporating the third character region into the line starting with the first character region, with a case of incorporating the third character region into the line starting with the second character region.

4 Claims, 15 Drawing Sheets

(51) Int. Cl.
*G06K 9/62* (2006.01)
*G06T 11/20* (2006.01)

(52) U.S. Cl.
CPC .......... *G06K 9/6215* (2013.01); *G06T 11/203* (2013.01); *G06K 2209/01* (2013.01)

(58) Field of Classification Search
CPC ............ G06K 9/00463; G06K 9/00449; G06T 11/203; G06F 17/245
USPC .................................................. 382/177, 321
See application file for complete search history.

(56) References Cited

U.S. PATENT DOCUMENTS

| | | | |
|---|---|---|---|
| 5,717,794 A * | 2/1998 | Koga | G06K 9/033 382/177 |
| 5,781,660 A | 7/1998 | Nitta et al. | |
| 6,332,046 B1 | 12/2001 | Fujimoto et al. | |
| 6,567,545 B1 * | 5/2003 | Kobara | G06K 9/00449 382/175 |
| 6,577,763 B2 | 6/2003 | Fujimoto et al. | |
| 8,600,175 B2 * | 12/2013 | Ishiguro | G06K 9/348 382/185 |
| 8,854,691 B2 * | 10/2014 | Kan | H04N 1/60 358/2.1 |

FOREIGN PATENT DOCUMENTS

| | | |
|---|---|---|
| JP | 2004-038530 A | 2/2004 |
| JP | 2006-277151 A | 10/2006 |
| JP | 2008-217833 A | 9/2008 |

\* cited by examiner

| LABEL NUMBER | UPPER LEFT COORDINATES | LOWER RIGHT COORDINATES |
|---|---|---|
| 1 | 20, 15 | 30, 28 |
| 2 | 33, 14 | 45, 28 |
| 3 | 49, 14 | 54, 27 |
| 4 | 58, 15 | 69, 28 |
| 5 | 80, 14 | 92, 28 |
| 6 | 95, 15 | 100, 27 |

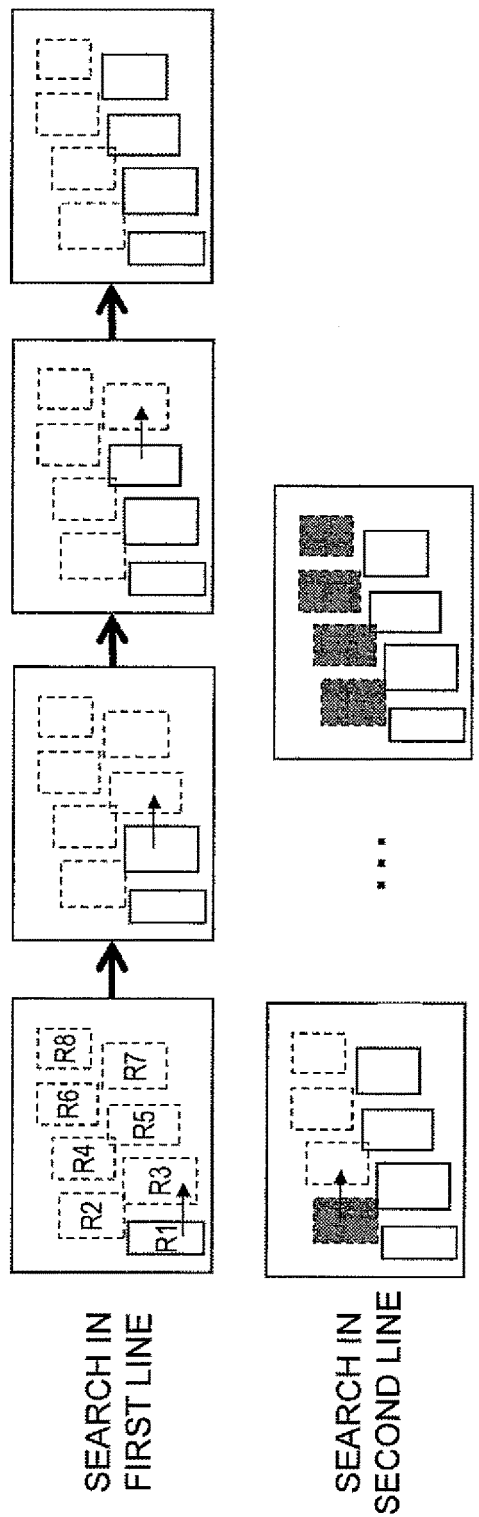
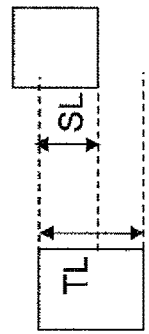
FIG. 9A
FIG. 9B

| LABEL NUMBER | UPPER LEFT COORDINATES | LOWER RIGHT COORDINATES | LINE NUMBER |
|---|---|---|---|
| 1 | 20, 35 | 30, 48 | 1 |
| 2 | 33, 14 | 45, 28 | 2 |
| 3 | 49, 34 | 54, 47 | 1 |
| 4 | 58, 15 | 69, 28 | 2 |
| 5 | 80, 34 | 92, 48 | 1 |
| 6 | 95, 15 | 100, 27 | 2 |
| 7 | 101, 35 | 112, 49 | 1 |
| 8 | 118, 15 | 129, 27 | 2 |

FIG. 10

IMAGE PROCESSING APPARATUS AND IMAGE PROCESSING METHOD

CROSS-REFERENCE TO RELATED APPLICATION

This application is based on Japanese Patent Application No. 2013-106439 filed with the Japan Patent Office on May 20, 2013, the entire contents of which are incorporated herein by reference.

BACKGROUND OF THE INVENTION

Field of the Invention

The present invention relates to a character recognition technology.

Description of the Related Art

Character recognition, which is one of the image processes, has been widely used in a variety of scenes such as automation of transcription (OCR: Optical Character Recognition) using a fax machine or a scanner, as well as inspection of printed characters in the production lines. There has recently been a trend to enforce traceability in the factory automation industry, further increasing the needs for the technology of reading characters printed on industrial products accurately at high speeds.

Character recognition is performed basically in two stages: a character segmentation process and a character recognition process. First, detection of character regions within an image, identification of the positions of the character regions, identification of lines and layouts, and the like are performed in the character segmentation process. The subsequent character recognition process identifies which one of the pixels within each character region represents a certain character (identification of characters is also called "reading characters").

While it is obviously important to improve the identification algorithm in order to improve character recognition accuracy, it is crucial to accurately identify the lines and layouts of the characters in the character segmentation process. A food package, for example, usually has the date of manufacture and the use-by date written in a set of two rows (two lines). However, unless the character segmentation process identifies which one of the characters (numbers) belongs to a certain line and then correctly separates a group of characters of the first line from a group of characters of the second line beforehand, the date of manufacture and the use-by date cannot be read successfully.

The fact that character strings are curved (a character string in the same line is written crookedly) is one of the reasons why line recognition (determining which character belongs to a certain line) cannot be performed correctly. The following are some of the typical reasons why such curved character strings are formed:

- the characters are printed on the surface of an object that is not flat;
- the object itself with characters printed thereon is curved (i.e., characters are printed on a sheet-like object or an object whose surface expands and shrinks);
- the layout design in which the character strings are written crookedly; and
- the printed characters are crooked due to a problem with the printer.

In addition, another problem in the image processing is that the lines cannot be recognized successfully when there are a number of characters in an image or when noise (stains, etc.) is misrecognized as characters.

Patent Literature 1, prior art pertaining to recognizing lines of crooked character strings, discloses a method for scanning a horizontally written document to recognize the characters in which whether two adjacent characters are in a single line or not is determined based on the degree of vertical overlap between the bounding rectangles of the two adjacent characters and a group of characters arranged in a single line is extracted by repeating this determination. This method might be effective in a document with a relatively wide spacing between lines (i.e., high separability between lines) and in an image with lines of characters arranged in an orderly fashion. Unfortunately, for a narrow line spacing or crooked character strings, there is a risk that the method may misrecognize the lines. For instance, consider an image containing the character strings shown in FIG. 15 (the first line: "123;" the second line: "ABCD"). The method disclosed in Patent Literature 1 might erroneously determine that "3" and "C" are located in the same line, as a result of searching in order of "1"->"2"->"3," starting from "1." Consequently, the method proceeds with the search to another line, such as "3"->"C"->"D," resulting in segmenting a character string "123CD" as a single line. Since the searching process ends up with searching in order of "A"->"B" in the next line, starting with "A," the misrecognition that occurs in the first line causes misrecognition of the second line as well.

Patent Literature 2 discloses a method for determining whether a line to be recognized in a document with combinations of vertical and horizontal lines is a vertical line or a horizontal line, based on the number of characters in each line, proximity between the characters, the size of the characters, the degree of homogeneity in spacing, and the like. This method, however, is not intended to recognize lines of crooked character strings, and even if this method is applied it is difficult to accurately recognize the lines of character strings shown in FIG. 15.

CITATION LIST

Patent Literature

Patent Literature 1: Japanese Patent Application Laid-open No. H8-44819
Patent Literature 2: Japanese Patent Application Laid-open No. 2008-217833

SUMMARY OF THE INVENTION

The present invention was contrived in view of the foregoing circumstances, and an object thereof is to provide a technique for improving the line recognition accuracy of the character segmentation process.

In order to achieve the foregoing object, the present invention employs the following configuration.

The present invention in its one aspect provides an image processing apparatus for identifying a region in each of a plurality of lines of character strings from an image containing the plurality of lines of character strings, the image processing apparatus comprises a character region setting unit configured to extract, from the image, character elements which are groups of pixels configuring characters, and set a plurality of character regions so as to include the character elements respectively; and a line recognition unit configured to divide the plurality of character regions into a plurality of lines, by executing a line extraction process for extracting a combination of character regions that are estimated to belong to the same line as a result of sequentially linking, starting from a certain character region, character regions that satisfy a predetermined adjacency condition, the line extraction process being repeatedly executed with different starting character regions, wherein, when there is a possibility that a third character region is redundantly selected in both a case where the line extraction process is performed starting from a first character region and a case where the line extraction process is performed starting from a second character region located in a line different from a line containing the first character region, the line recognition unit determines which line to incorporate the third character region in, by comparing a case of incorporating the third character region into the line starting with the first character region, with a case of incorporating the third character region into the line starting with the second character region.

According to this configuration, in consideration of, or by comparing, the possibility that the third character region belongs to the same line as the first character region and the possibility that the third character region belongs to the same line as the second character region, which line is appropriate to incorporate the third character region is determined. Therefore, highly accurate line recognition with less erroneous determination than the prior art can be realized.

As the method for "comparing incorporating the third character region into the line starting with the first character region, with incorporating the third character region into the line starting with the second character region," a method for evaluating the local connectivity of the third character region itself (which line the third character region has good connectivity with), a method for creating a variety of different linking destinations of the third character region (candidates for ways to divide a line) and comprehensively evaluating the validity of each candidate, and various other methods can be employed.

For example, a method in which the line recognition unit compares the strength of linkage between an adjacent character region in the line starting with the first character region and the third character region, with the strength of linkage between an adjacent character region in the line starting with the second character region and the third character region, and then incorporates the third character region into the line with the stronger linkage, can be employed as "the method for evaluating the local connectivity."

According to this method, simply evaluating the local connectivity between an adjacent character region and the third character region is enough to realize a high-speed, easy process. In addition, the sections that are linked wrong can be corrected one by one when repeatedly executing the line extraction process on each line.

Various barometers can favorably be used as a barometer for evaluating "the strength of linkage," such as "the degree of overlap between an adjacent character region and the third character region in a direction perpendicular to the direction of the lines," "the degree of similarity in size (height, width, area, etc.) between the adjacent character region and the third character region," and "the degree of similarity in characteristics of the color or brightness between the image within the adjacent character region and the image within the third character region." Moreover, "the closeness (the narrowness of the distance) between the adjacent character region and the third character region," "the strength of the connection relation between the character contained in the adjacent character region and the character contained in the third character region," and the like can be used as a barometer for evaluating "the strength of linkage." Two or more of these barometers may be combined, or alternatively a barometer other than these barometers may be used.

Additionally, a method for using a format character string defining the format of the character string of each line can be employed as the "method for comprehensively evaluating the validity of each of the plurality of candidates." Specifically, as a first candidate, the line recognition unit sets a plurality of lines that are generated when incorporating the third character region into the line starting with the first character region, and as a second candidate, the line recognition unit sets a plurality of lines that are generated when incorporating the third character region into the line starting with the second character region. The line recognition unit then compares the degree of similarity between the format of the character string recognized from each of the lines of the first candidate and the format of the character string of each of the lines defined by the format character string, with the degree of similarity between the format of the character string recognized from each of the lines of the second candidate and the format of the character string of each of the lines defined by the format character string, and employs the candidate with the higher degree of similarity.

In this method, a candidate that best matches the format of the character strings defined by the format character string is selected from among the plurality of possible candidates. For this reason, this method can achieve line recognition that is more accurate and cause less erroneous determination. This method can favorably be applied when the number of lines and the format of each line are already known as in use-by dates, lot numbers, license plates of cars, card numbers, and the like.

The format character string may be information for at least defining the number of characters configuring a character string and the types of some or all of the characters. Knowing the number of characters and the types of the characters is extremely helpful in determining the validity of each line candidate.

The term "line" means an arrangement of a plurality of characters. In the present specification, an arrangement of characters in any direction such as a horizontal direction, a vertical direction and an oblique direction is referred to as "line." The term "character" can imply all types of characters such as alphabets, numbers, signs, special characters, Chinese characters, the hiragana characters, the katakana characters, and emoji. The term "character element" means a group of pixels configuring a character (a block of a plurality of pixels). While it is desirable that a group of pixels configuring a single character be extracted as a character element, a group of pixels corresponding to a part of a character or a group of pixels configuring a plurality of characters in a single line may be extracted as a character element. The term "character region" means a region that is set to include a single character element. For example, a bounding rectangle of a character element can be used.

Note that the present invention can be considered as an image processing apparatus with at least part of the foregoing configurations or functions, a line recognition apparatus, character recognition apparatus, inspection apparatus, or robot vision having this image processing apparatus. The present invention can also be considered as an image processing method, line recognition method, character recognition method, or inspection method having at least part of the foregoing processes, a program for causing a computer to execute each of the steps of these methods, and a computer-readable recording medium with this program stored therein. The configurations and processes described above can be combined to configure the present invention as long as the combinations do not generate technical inconsistency.

The present invention can improve the line recognition accuracy of the character segmentation process.

BRIEF DESCRIPTION OF THE DRAWINGS

FIGS. 9A and 9B are each a diagram for explaining a line recognition process according to the first embodiment;

FIG. 10 is a diagram showing the results of the line recognition process according to the first embodiment;

DESCRIPTION OF THE EMBODIMENTS

Preferred embodiments of the present invention are now described hereinafter with reference to the drawings. The following embodiments provide examples of applying an image processing apparatus according to the present invention to a visual sensor system that reads and inspects a character string printed on a product. In many cases, the lines or characters in a character string printed on a product cannot easily be segmented due to the fact that the lines are crooked or the line spacing is narrow. For this reason, a character string printed on a product is one of the examples to which a character segmentation process according to the present invention can favorably be applied. The visual sensor system, however, is merely an example of application of the present invention, and therefore, the present invention can be applied to any systems employing character recognition, such as line recognition apparatuses, character recognition apparatuses, inspection apparatuses, and robot vision.

<First Embodiment>

(Visual Sensor System)

Figure 1:
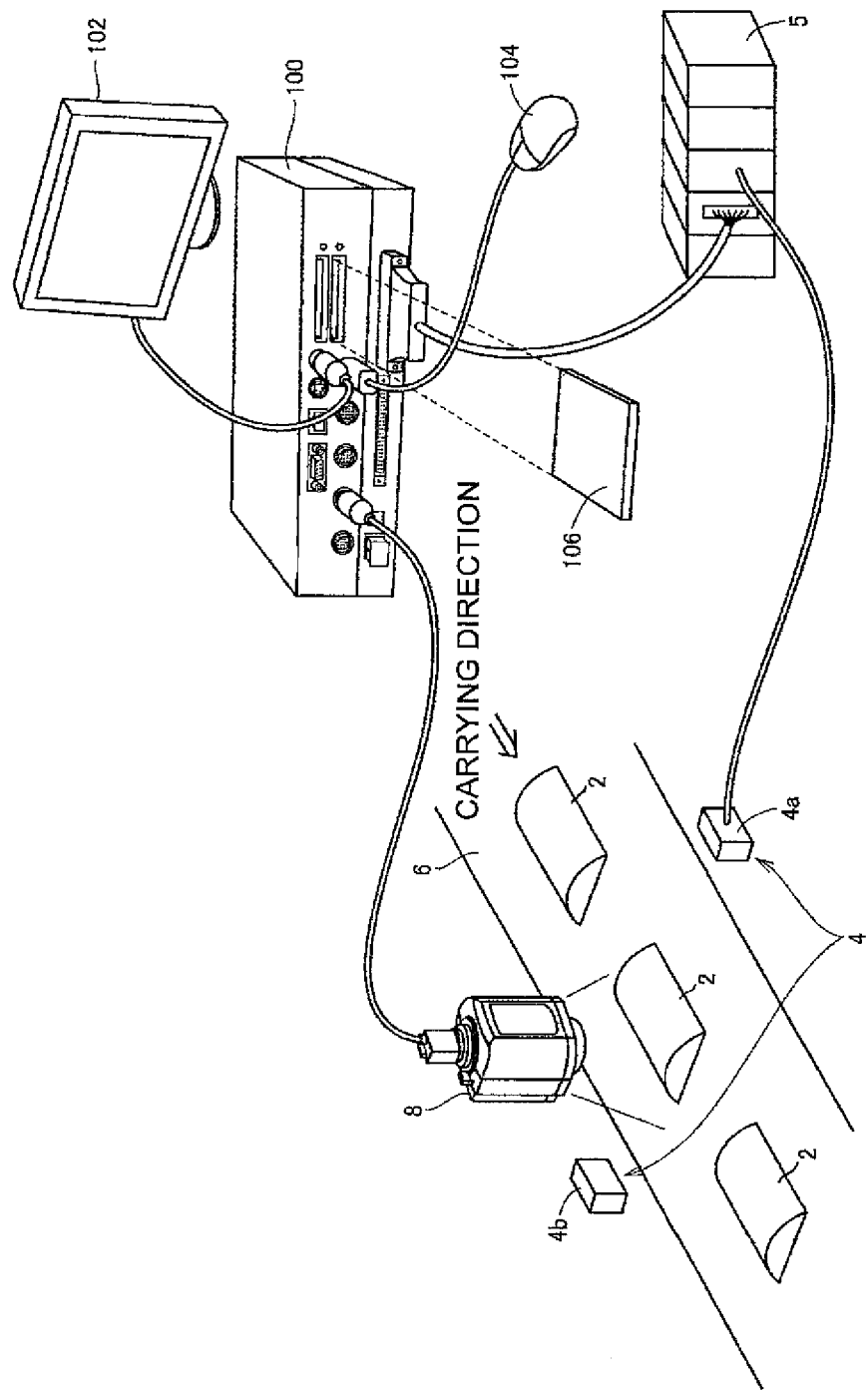
FIG. 1 is a diagram showing the entire configuration of a visual sensor system.

The entire configuration of a visual sensor system 1 with an image processing apparatus 100 is now described with reference to FIG. 1.

The visual sensor system 1 is a system that is incorporated in the production lines and reads and inspects a character string printed on a product (work 2) by executing character recognition on an input image obtained as a result of imaging the work 2. The work 2 is carried by a carrier mechanism 6 such as a belt conveyor and imaged by a camera 8 at a predetermined timing. The image captured by the camera 8 is transmitted to the image processing apparatus 100. The image processing apparatus 100 executes such processes as line and character segmentation and character recognition on the input image, and displays the results on a display 102 or outputs the results to an external device.

The fact that the work 2 enters the visual field of the camera 8 is detected by a photoelectronic sensor 4 installed in the carrier mechanism 6. Specifically, the photoelectronic sensor 4 uses a light receiver 4a thereof to detect that the light emitted from a projector 4b is blocked by the work 2, thereby detecting the entry of the work 2. A trigger signal of this photoelectronic sensor 4 is output to a PLC (Programmable Logic Controller) 5. The PLC 5 receives the trigger signal and controls the carrier mechanism 6.

(Hardware Configuration of Image Processing Apparatus)

Figure 2:
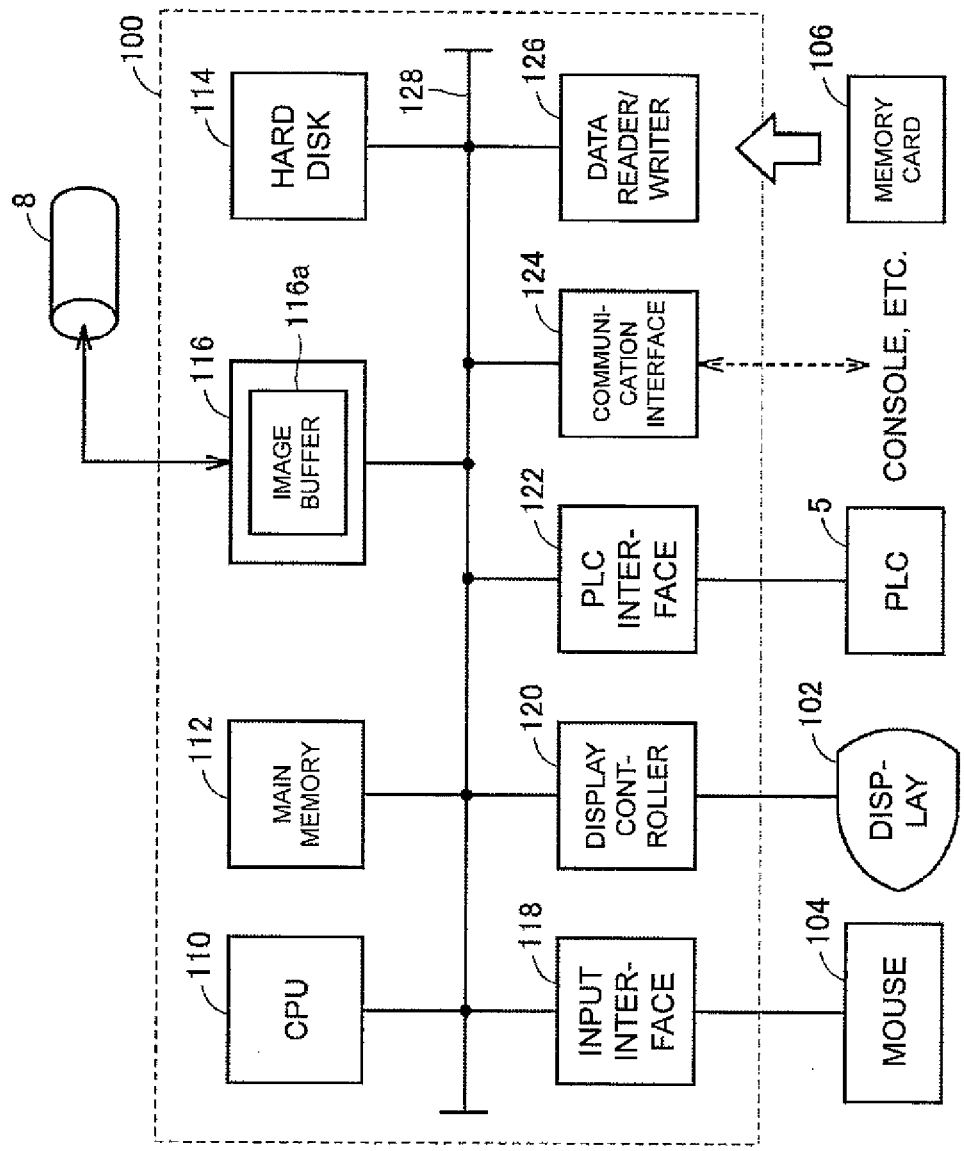
FIG. 2 is a schematic configuration diagram of an image processing apparatus.

FIG. 2 is a schematic configuration diagram of the image processing apparatus 100. The image processing apparatus 100 has a CPU (Central Processing Unit) 110, a main memory 112 and a hard disk 114, both of which function as storage units, a camera interface 116, an input interface 118, a display controller 120, a PLC interface 122, a communication interface 124, and a data reader/writer 126. These parts are connected to one another by a bus 128 so as to be able to communicate data with one another. The camera interface 116 is a part for mediating transmission of data between the CPU 110 and the camera 8 and has an image buffer 116a for temporarily accumulating image data that are input from the camera 8. The input interface 118 mediates transmission of data between the CPU 110 and input units such as a mouse 104, a keyboard, and a touch panel. The display controller 120 is connected to the display 102 and controls the display action performed by the display 102. The PLC interface 122 mediates transmission of data between the CPU 110 and the PLC 5. The communication interface 124 mediates transmission of data between the CPU 110 and a console (or a personal computer or a server) and the like. The data reader/writer 126 mediates transmission of data between the CPU 110 and a memory card 106 which is a storage medium.

The image processing apparatus 100 is typically a computer with a general-purpose architecture, in which the CPU 110 provides various functions by executing programs (instruction codes) stored in the hard disk 114 or memory card 106. Such programs are typically distributed as stored in the memory card 106 or a computer-readable recording medium such as an optical disk.

When using a general-purpose computer as the image processing apparatus 100, an OS (Operating System) that provides the basic functions of a computer may be installed in addition to the application programs that provide the functions according to the present embodiment. In this case, the programs according to the present embodiment may be for invoking, in a predetermined array at a predetermined timing, necessary modules out of program modules provided as part of the OS, to execute processes. In other words, the programs themselves according to the present embodiment may not include such modules but may be used to execute the processes in cooperation with the OS. The programs according to the present embodiment may not include these modules.

The programs according to the present embodiment may be provided as part of other programs. In this case as well, the programs themselves may not include modules of the other programs to be combined but may be used to execute the processes in cooperation with these other programs. In other words, the programs according to the present embodiment may be incorporated in these other programs. Some or all of the functions provided through the execution of the programs may be mounted as special hardware circuits.

(Functional Configuration of Image Processing Apparatus)

Figure 3:
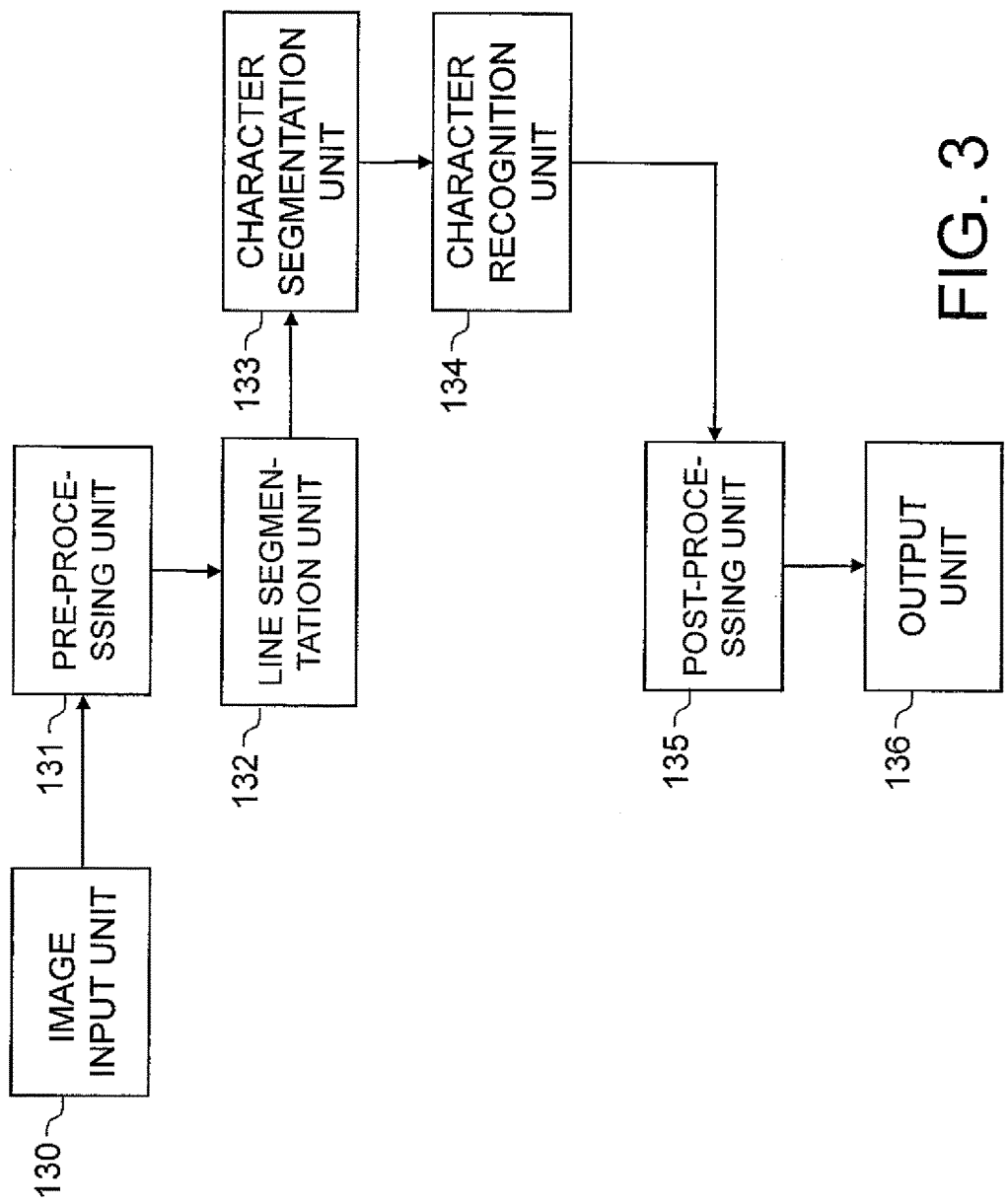
FIG. 3 is a functional configuration diagram of a character recognition process according do a first embodiment.

FIG. 3 shows a functional configuration for realizing a character recognition process according to the first embodiment. The image processing apparatus 100 has an image input unit 130, a pre-processing unit 131, a line segmentation unit 132, a character segmentation unit 133, a character recognition unit 134, a post-processing unit 135, and an output unit 136, as the functions associated with the character recognition process. These functional blocks are realized by causing the CPU 110 of the image processing apparatus 100 to execute a computer program. In the present embodiment, the line segmentation unit 132 corresponds to the character region setting unit and the line recognition unit of the present invention.

(Entire Flow of Character Recognition Process)

The operation of each of the functional blocks shown in FIG. 3 and the entire flow of the character recognition process are now described with reference to FIG. 4.

When the trigger signal is input from the PLC 5, the image input unit 130 imports the image of the work 2 from the camera 8 (step S100). The format of the input image (the resolution, color/black-and-white, gradation, data format, etc.) may be any format and may be selected in accordance with the type of the work 2 or the sensing purposes. The image "P100" shown in FIG. 4 is an example of the input image, in which a character string is printed on an upper surface (a curved surface) of the work 2.

Next, the pre-processing unit 131 executes a pre-process, such as binarization of the input image, and separates the input image into a character section and a background section (step S101). For example, a discriminant analysis method, dynamic binarization, Niblack's binarization method or the like may be used as the method for binarization. For the purpose of noise removal, a data smoothing process may be executed prior to binarization. For example, a Gaussian filter, a median filter or the like can be used for data smoothing. If need be, the image may be expanded, reduced, rotated and/or trimmed to obtain an image suitable for character recognition. The image "P101" shown in FIG. 4 is an example of a binarized image obtained after the pre-process, in which the character section thereof consists of black pixels and the rest consists of white pixels.

Subsequently, the line segmentation unit 132 detects each individual character region from the binarized image, divides the plurality of detected character regions into a plurality of lines, and thereby identifies the regions corresponding to each line (step S102). This process is called "line segmentation" or "line recognition." This process will be described hereinafter in detail. The image "P102" shown in FIG. 4 is the result of the line recognition, in which the character regions in the first line are shown with broken lines and the character regions in the second line are shown with solid lines.

Next, the character segmentation unit 133 segments the characters of each line one by one (step S103). Specifically, the character segmentation unit 133 scans the character regions of each line sequentially and separates a plurality of characters when the plurality of characters are present in a single character region or consolidates the surrounding character regions when a character region has only a part of a character. Consequently, the black pixels in each line are clipped, character-by-character. The image "P103" shown in FIG. 4 is the result of the character segmentation.

Next, the character recognition unit 134 executes character recognition (identification of a character) for each of the characters identified in step S103 (step S104). A number of methods can be employed for this character recognition. Examples of these methods include brightness-based matching and edge feature matching.

Thereafter, if necessary, the post-processing unit 135 corrects the recognition result obtained in step S104 in view of the arrangement of the characters (step S105). Finally, the output unit 136 outputs the character string, which is the recognition result, to the display 102 or external device (step S106), completing the process.

(Line Segmentation Process)

Figure 4:
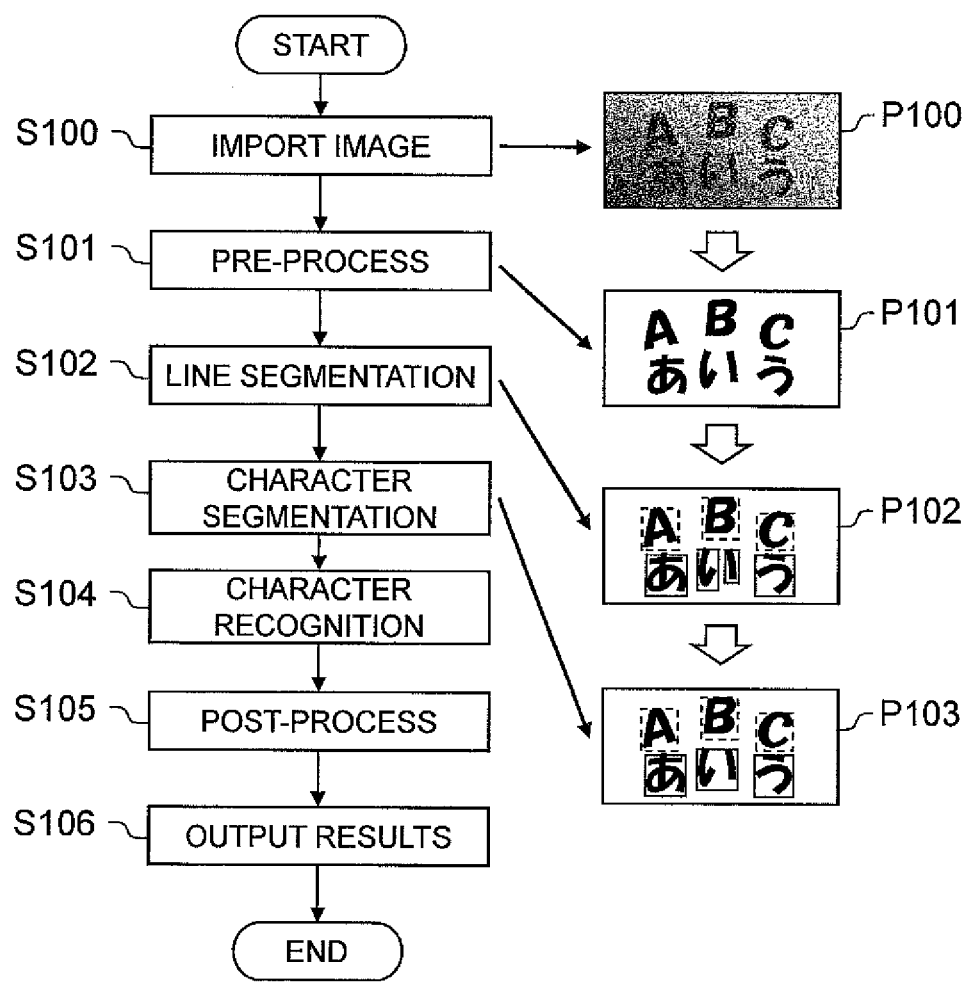
FIG. 4 is an entire flow of the character recognition process according to the first embodiment.
Figure 5:
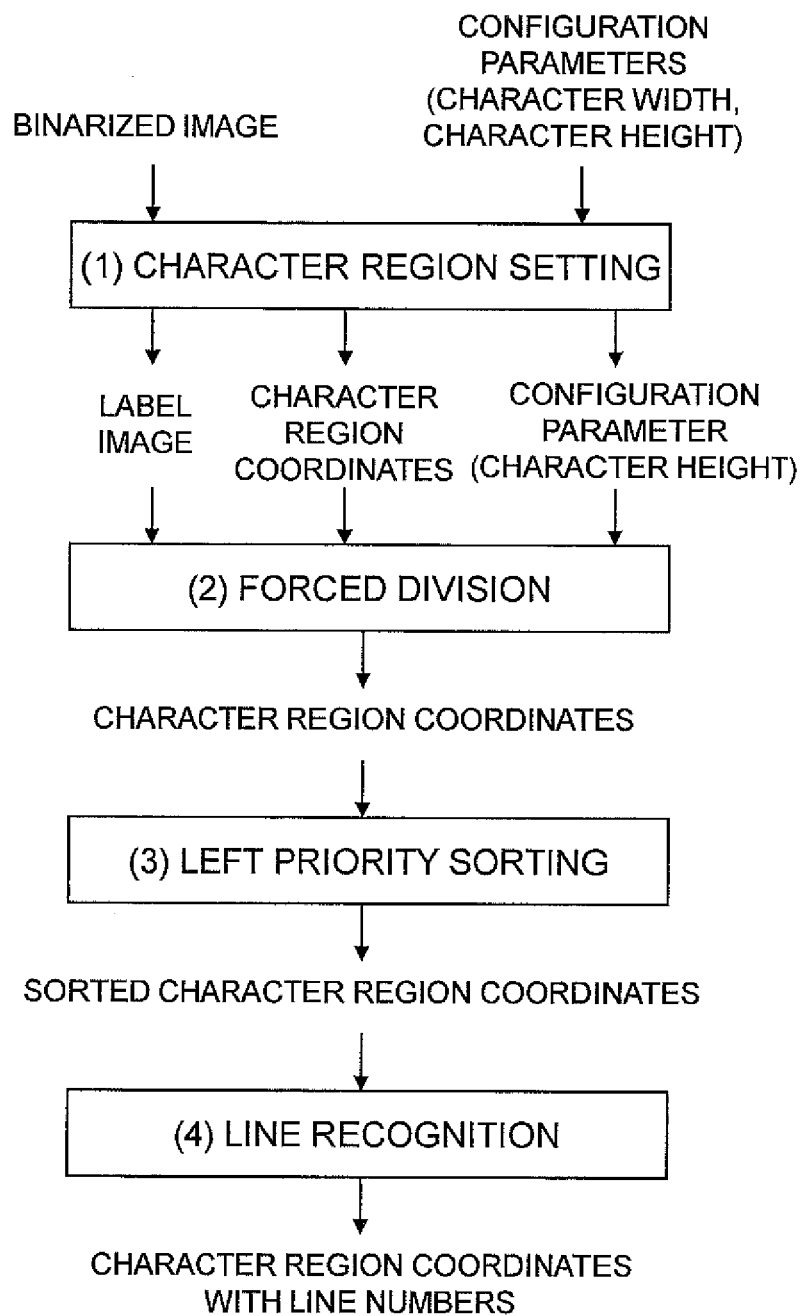
FIG. 5 is a diagram for explaining a line segmentation process according to the first embodiment.

The line segmentation process of step S102 shown in FIG. 4 is now described in detail with reference to FIG. 5. The line segmentation process is executed in order of (1) character region setting, (2) forced division, (3) left priority sorting, and (4) line recognition. However, (2) forced division and (3) left priority sorting can be omitted. Each of the processes (1) to (4) is described below.

(1) Character Region Setting

The line segmentation unit 132 receives the binarized image generated in the pre-process and configuration parameters and executes a character region setting process. Information on a character width and on a character height are provided as the configuration parameters. Single values such as "20 pixels" and "7.5 mm" may be provided as the character width and the character height respectively. When the image has characters in different sizes, ranges (the minimum values and the maximum values) such as "10 pixels to 20 pixels" and "6.0 mm to 10 mm" may be provided.

Figures 6A, 6B:
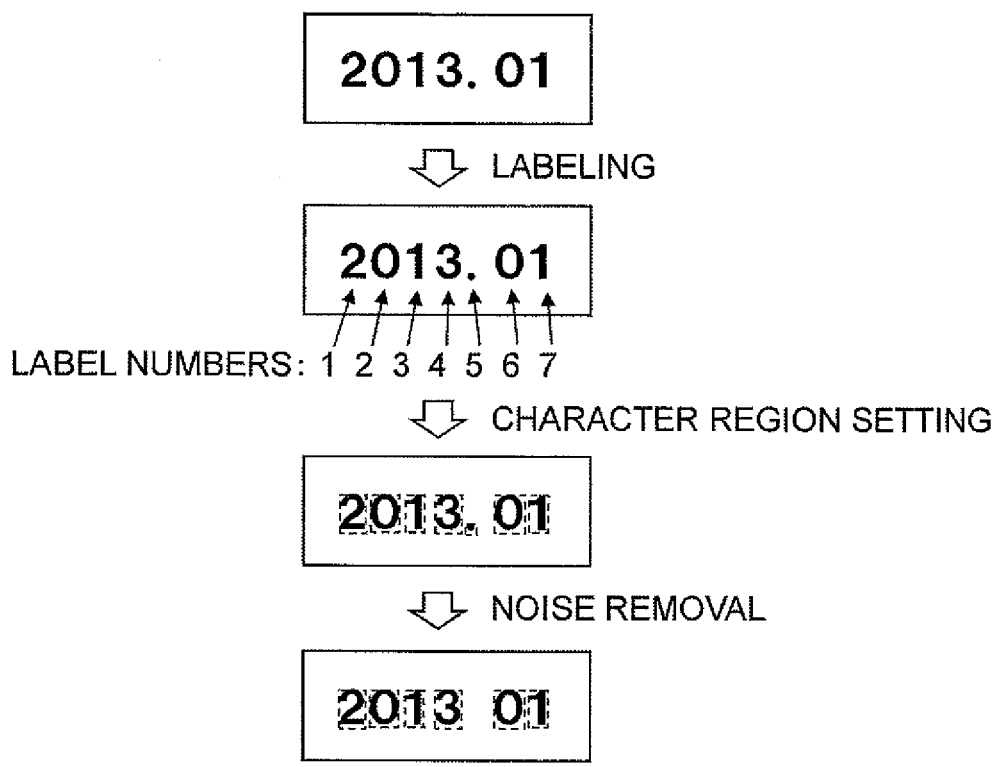
FIGS. 6A and 6B are each a diagram for explaining a character region setting process according to the first embodiment.

FIG. 6A shows a flow of the character region setting process. First of all, the line segmentation unit 132 performs labeling on the binarized image. Specifically, the line segmentation unit 132 detects linked components (a bunch of connected pixel groups) from the binarized image and assigns different labels (numbers) to the detected linked components respectively. The linked components (pixel groups) that are assigned the same label are referred to as "character elements." The line segmentation unit 132 then sets a plurality of character region to include the respective character elements. In this example, the bounding rectangles of the character elements are calculated and are treated as the character regions. Finally, the line segmentation unit 132 compares the width and height of each character region with "character width" and "character height" that are provided as the configuration parameters. When the width and height of each character region are equal to or less than the configuration parameters by a constant value (e.g., equal to or less than 30% of the configuration parameters), the character element contained in this character region is considered as noise and therefore eliminated. A significantly small region out of the plurality of detected character regions (e.g., a region, the width and height of which are equal to or less than the average width and height of the detected character regions by a constant value (e.g., equal to or less than 30% of the average width and height)) can be considered as noise and thus eliminated.

The example in FIG. 6A shows that six character regions are obtained. As a result of the character region setting process, a label image and character region coordinate data are created. The label image is an image in which in each pixel is written a label number. The character region coordinate data is, as shown in FIG. 6B, data in which the coordinate systems of the respective character regions (e.g., the coordinate systems of two points: upper left and lower right) are written in order of the label numbers.

(2) Forced Division

Figure 7:
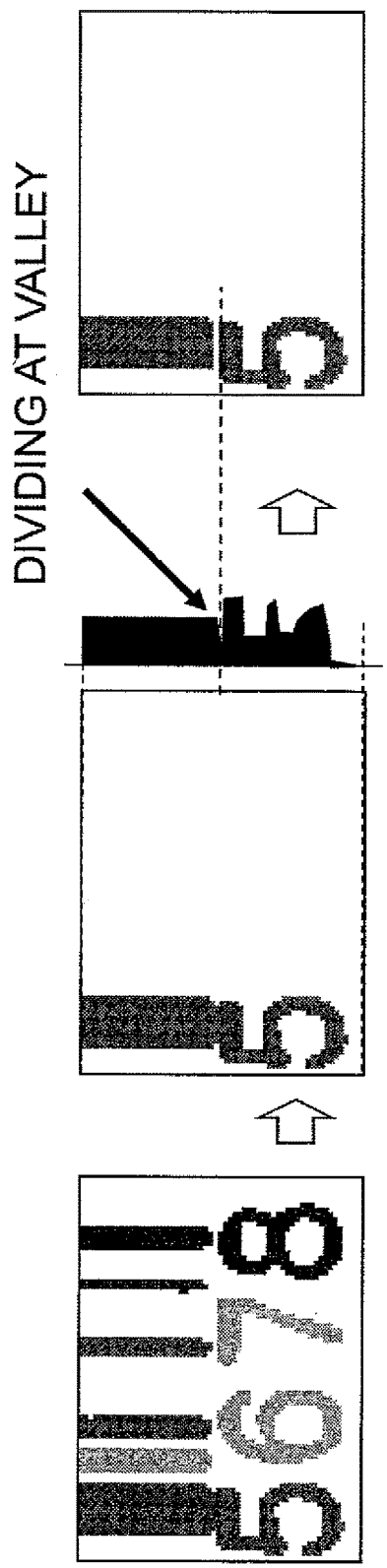
FIG. 7 is a diagram for explaining a forced division process according to the first embodiment.

The line segmentation unit 132 checks the height of each character region based on the character region coordinate data, and executes forced division on a character region whose height exceeds a predetermined threshold. The threshold may be determined based on the character height provided as the configuration parameter (e.g., 130% of the character height, etc.). FIG. 7 shows an example of forced division. When there exists a character connected to another pattern (one of the bars of a barcode, in this example) as shown in the example in FIG. 7, the character and the pattern are recognized as one element in the labeling process, and therefore the height of the character region exceeds the threshold. From the label image, the line segmentation unit 132 extracts a portion of the character region whose height exceeds the threshold, and then creates a horizontal projection histogram in which the black pixels are counted in the horizontal direction. The line segmentation unit 132 then vertically searches for a valley in the histogram. When a valley is detected, the character region is divided based on the height of the detected valley. When the forced division is executed, a new label number is assigned to the divided character region, and the character region coordinate data is updated. There are various methods of forced division in addition to the method shown in FIG. 7, and any of those methods may be used.

(3) Left Priority Sorting

Figure 8:
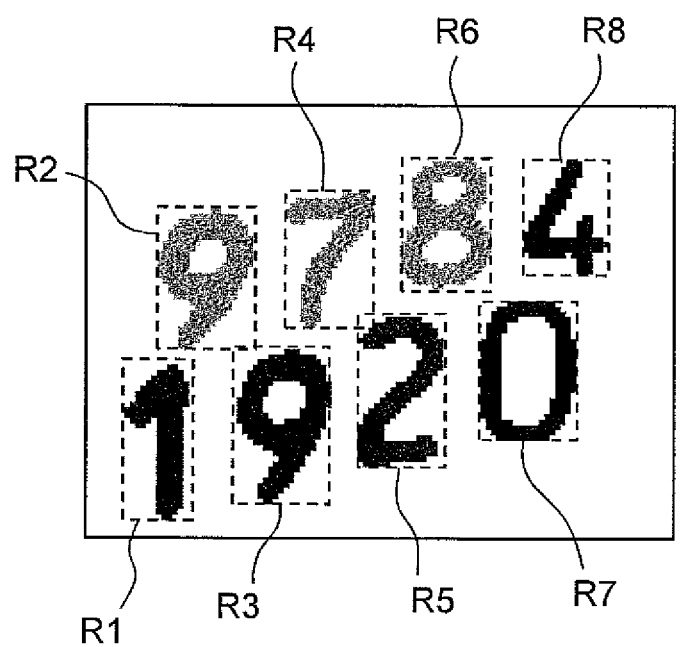
FIG. 8 is a diagram for explaining a left priority sorting according to the first embodiment.

The line segmentation unit 132 performs left priority sorting on each of the character regions based on the character region coordinate data. Specifically, label numbers are reassigned starting from the character region having a small X-coordinate of the upper left point (the coordinate in the horizontal direction). In this case, no correction needs to be made on the label image itself, so the label numbers in the character region coordinate data and the order in which the label numbers are written, may simply be updated. FIG. 8 shows the sorted label numbers. Reference character Rx represents a character region that is assigned a label number "x."

(4) Line Recognition

The line segmentation unit 132 executes line recognition (line segmentation) using the character region coordinate data in which the label numbers are sorted. In the present embodiment, the line segmentation unit 132 performs an operation of dividing the plurality of character regions included in the character region coordinate data into a plurality of lines, by executing a line extraction process (also referred to as "line search") for extracting a combination of character regions that are estimated to belong to the same line as a result of sequentially linking, starting from a certain character region, the character regions that satisfy a predetermined adjacency condition, the line extraction process being repeatedly executed with different starting character regions.

FIG. 9A schematically shows an example of executing the line recognition on a group of character regions shown in FIG. 8.

First, starting from a character region R1 with the smallest label number, the line segmentation unit 132 executes the line extraction process on the first line. Specifically, the line segmentation unit 132 assigns line number "1" to the starting character region R1 and then sets the character region R1 as a character region of focus. Subsequently, starting from a character region R2 having the second smallest label number after the character region of focus R1, the adjacency relationship between the character region of focus R1 and each character region is evaluated, and a character region that satisfies the predetermined adjacency condition is detected.

In the present embodiment, as shown in FIG. 9B, a ratio of a vertical overlap width SL of each of two character regions to a height TL of the character region of focus is defined as "overlapping ratio R(=SL/TL)." When the overlapping ratio R is greater than a predetermined threshold (e.g., 1/3), it is determined that the two character regions are located adjacent to each other. It should be noted that the value of the threshold can be changed accordingly. The definition equation for the overlapping ratio is not limited to the foregoing example. For instance, the ratio of the overlap width SL to a height TL' of a character region that is not the character region of focus, may be taken into consideration.

Consequently, a character region. R3 is detected as the character region that satisfies the adjacency condition in relation to the character region of focus R1 (referred to as "adjacent character region"), as shown in FIG. 9A. The line segmentation unit 132 assigns the current line number "1" to the detected adjacent character region R3 (this process is also described as "linking the character region R3 to the character region R1" or "incorporating the character region R3 into the line starting with the character region R1"), sets this character region R3 as a new character region of focus, and searches for another adjacent character region. Another adjacent character region is searched for until it can no longer be found. As a result, a combination of character regions configuring the first line, "R1->R3-R5->R7," is extracted, as shown in FIG. 9A.

Upon completion of the search in the first line, the line segmentation unit 132 selects a character region having the lowest label number from among the character regions that are not assigned any label numbers, and sets the selected character region as the next (in the second line) starting point. In the example shown in FIG. 9A, the character region R2 is selected as the starting point and is assigned line number "2." The subsequent processes are the same as those performed on the first line. In the present embodiment, the character regions that are already assigned the line numbers are counted as the targets for searching for the adjacent character regions. In other words, when the character region of focus is the character region R2, searching for an adjacent character region is carried out in order of R3, R4, R5 and the like. Such a method is employed for the purpose of enabling correction of an erroneous determination (linkage rearrangement) (the details are described hereinafter with reference to FIG. 11).

In the example shown in FIG. 9A, a combination of the character regions, "R2->R4->R6->R8," is extracted as a result of the search in the second line. All of the character regions are assigned the line numbers in this manner, completing the line recognition. The results of the line recognition are shown in FIG. 10 in which the line numbers are added to the character region coordinate data.

(Correction of Erroneous Determination)

An erroneous determination correction procedure of the (4) line recognition process is now described with reference to FIG. 11. The image shown in FIG. 11 contains two lines of character strings: "123" and "ABCD." Because each of the character strings is crooked significantly, a linking process performed based on the adjacency condition described above is likely to cause erroneous line determination.

Figure 11:
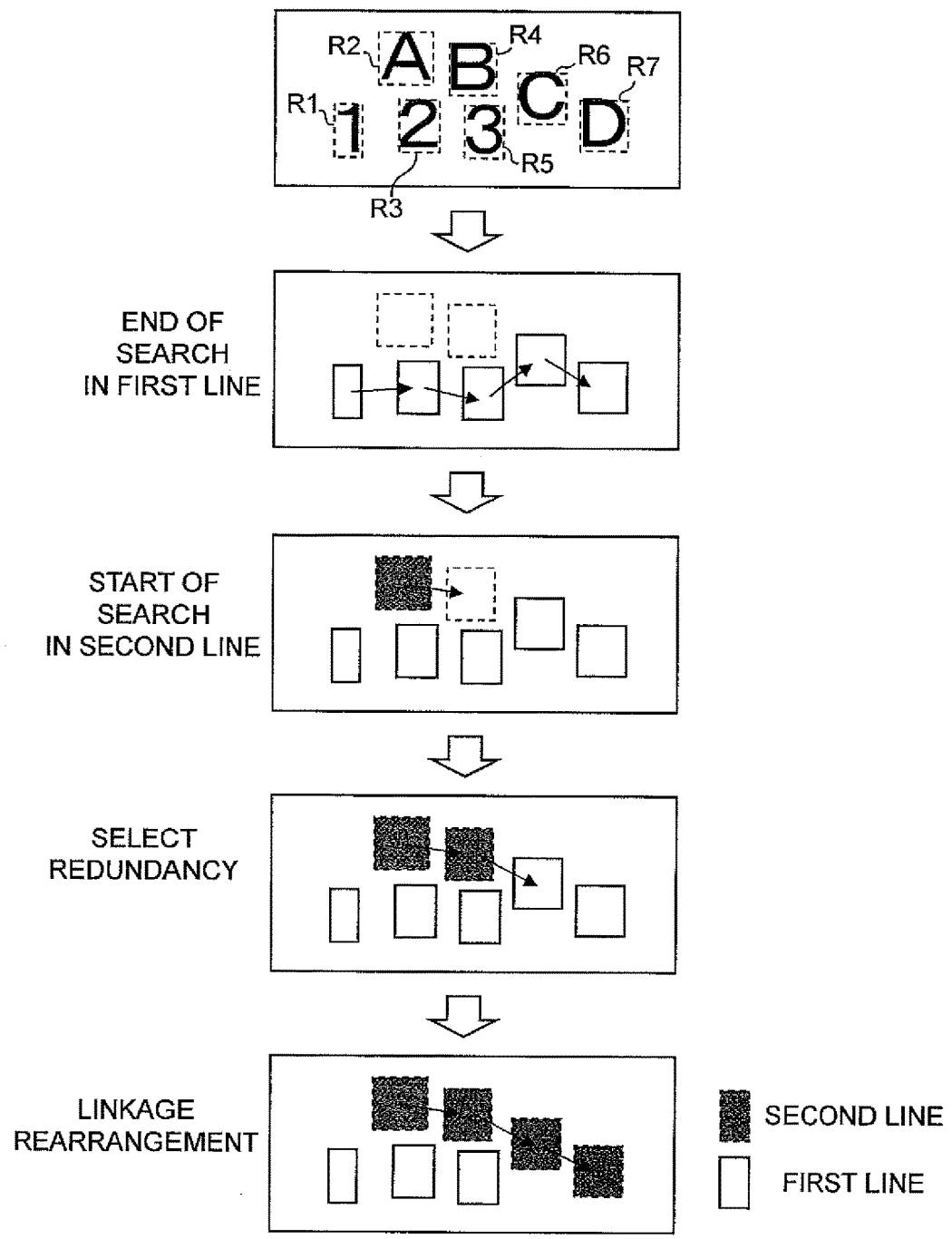
FIG. 11 is a diagram for explaining an erroneous determination correction procedure of the line recognition process according to the first embodiment.

In the image shown in FIG. 11, searching the first line starting with a character region R1 (character "1") is performed. Consequently, the character regions are linked in the form of "R1->R3->R5," and then it is determined that a character region R6 satisfies the adjacency condition in relation to a character region R5 (wrong determination). As a result, a combination, "R1->R3->R5->R6->R7" (a character string "123CD"), is extracted in the form of a single line. In other words, upon completion of the search in the first line, the character regions R1, R3, R5, R6 and R7 are each assigned line number "1."

Subsequently, the line segmentation unit 132 searches the second line starting with a character region R2 (character "A"). In this search, the character regions are linked in the form of "R2->R4," and then it is determined that the character region R6 satisfies the adjacency condition in relation to the character region R4 (correct determination). In other words, a situation arises in which the same character region R6 (the third character region) is selected redundantly, both when the line extraction process is performed with the character region R1 (the first character region) as the starting point, and when the line extraction process is performed with the character region R2 (the second character region) as the starting point. Whether this situation is caused or not can be determined based on whether a line number is already assigned to the character region R6 which is determined to satisfy the adjacency condition.

In a case where this situation arises, the line segmentation unit 132 compares the case of incorporating the character region R6 into the first line with the case of incorporating the character region R6 into the second line, and determines which line is appropriate to incorporate the character region R6. Specifically, the line segmentation unit 132 compares the overlapping ratio between the character regions R5 and R6 in the first line with the overlapping ratio between the character regions R4 and R6 in the second line, decides that the greater overlapping ratio has a strong linkage, and thereby incorporates the character region R6 into the line with the strong linkage. In case of the example shown in FIG. 11, because the character region R6 is linked more strongly to the character region R4 in the second line, the line segmentation unit 132 changes the line number of the character region R6 from "1" to "2" (this operation corresponds to the operation of displacing the character region R6 from the first line to the second line). Subsequently, the line segmentation unit 132 proceeds with the search, whereby the line numbers of the character regions R7 and R8 are changed as well to "2," and finally, as a result, the corrected first line "R1->R3->R5" and the corrected second line "R2->R4->R6->R7" are obtained. Therefore, even when an erroneous determination is made during the search in the first line, such determination is corrected and the correct line recognition results can be obtained.

This example uses a vertical overlapping ratio (degree of overlap) as the barometer for evaluating the strength of linkage, but other barometers may be used instead of this barometer. For instance, when the direction of a line is vertical, the degree of widthwise overlap of characters should be evaluated. To be precise, the degree of overlap in a direction perpendicular to the direction of the line should be evaluated. In addition, the degree of similarity in size between two character regions may be used as another evaluation barometer. Specifically, because characters contained in a single line are usually equal in size to one another, it is estimated that the more resemblant the heights, widths and areas of two character regions are to each other, the stronger the linkage therebetween. Furthermore, the degree of similarity in characteristics of the color or brightness between images of two character regions may be used as yet another barometer. In other words, because characters contained in a single line are usually equal in color and brightness to one another, it is estimated that the more resemblant the colors and brightness of the both images (images of characters) are to each other, the stronger the linkage therebetween. The closeness (the narrowness of the distance) between two character regions or the strength of the connection relation between the characters contained in the two character regions may be evaluated as well. For instance, in a case where a character string consisting of these two characters (or along with the surrounding characters) is a word registered in a word dictionary, or in a case where these two characters share the same character type, it can be estimated that the connection relation between these two characters is strong. Needless to say, the strength of linkage between characters may be evaluated using a combination of two or more of these barometers.

(Advantages of First Embodiment)

According to the configuration of the first embodiment described above, in the case shown in FIG. 11, for example, in consideration of, or by comparing, the possibility that the character region R6 belongs to the first line and the possibility that the character region R6 belongs to the second line, to determine which line is appropriate to incorporate the character region R6. Accordingly, highly accurate line recognition with less erroneous determination than the prior art can be realized. Moreover, simply evaluating the local connectivity of the character region R6 is enough to realize a high-speed, easy process. In addition, the sections that are linked wrong can be corrected one by one when repeatedly executing the line extraction process on each line.

<Second Embodiment>

A second embodiment of the present invention is described next. When the number of lines and the format of each line (the number of characters, the types of characters, etc.) are already known as in use-by dates, lot numbers, license plates of cars, card numbers, and the like, line recognition with less erroneous determination can be expected by providing the information on the number of lines and the format of each line as knowledge. In the second embodiment, a "format character string" for defining the format of a character string of each line is used for line recognition. The configurations other than the line recognition process are the same as those of the first embodiment; thus, the detailed descriptions thereof are omitted accordingly.

(Functional Configuration of Image Processing Apparatus)

Figure 12:
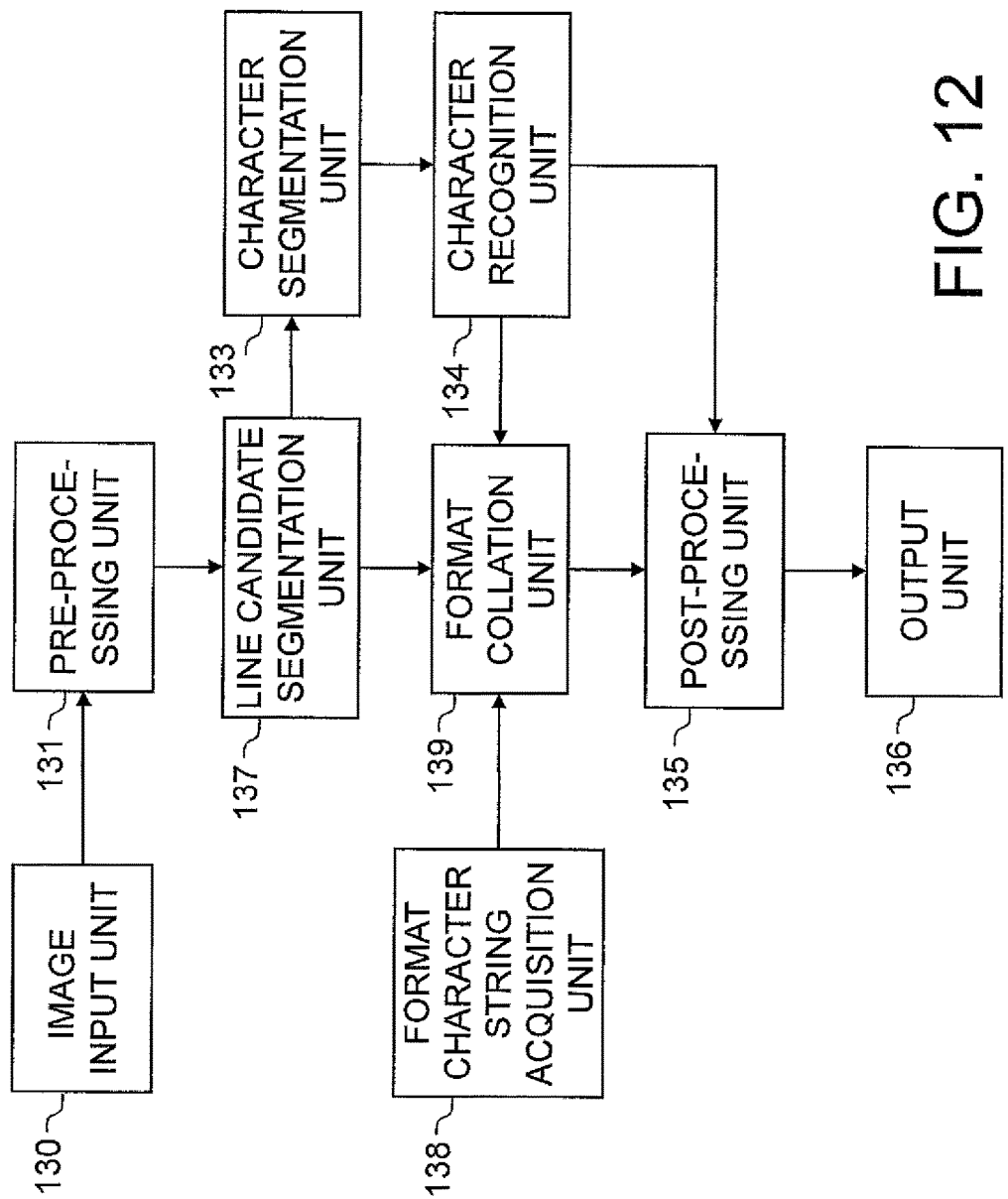
FIG. 12 is a functional configuration diagram of a character recognition process according to a second embodiment.

FIG. 12 shows a functional configuration for realizing a character recognition process according to the second embodiment. The image processing apparatus 100 has the image input unit 130, the pre-processing unit 131, a line candidate segmentation unit 137, the character segmentation unit 133, the character recognition unit 134, a format character string acquisition unit 138, a format collation unit 139, and the output unit 136, as the functions associated with the character recognition process. These functional blocks are realized by causing the CPU 110 of the image processing apparatus 100 to execute a computer program. In the present embodiment, the line candidate segmentation unit 137 corresponds to the character region setting unit of the present invention, the line candidate segmentation unit 137 and the format collation unit 139 each correspond to the line recognition unit of the present invention, and the format character string acquisition unit 138 corresponds to the format character string acquisition unit of the present invention.

(Line Candidate Segmentation Process)

A line candidate segmentation process performed by the line candidate segmentation unit 137 is now described with reference to FIG. 13. The line candidate segmentation process is almost the same as the line segmentation process described in the first embodiment, but the difference therebetween is that when a character region that is likely to be linked to a plurality of lines is detected, all possible line candidates are extracted instead of performing linkage rearrangement based on the strength of linkage.

Figure 13:
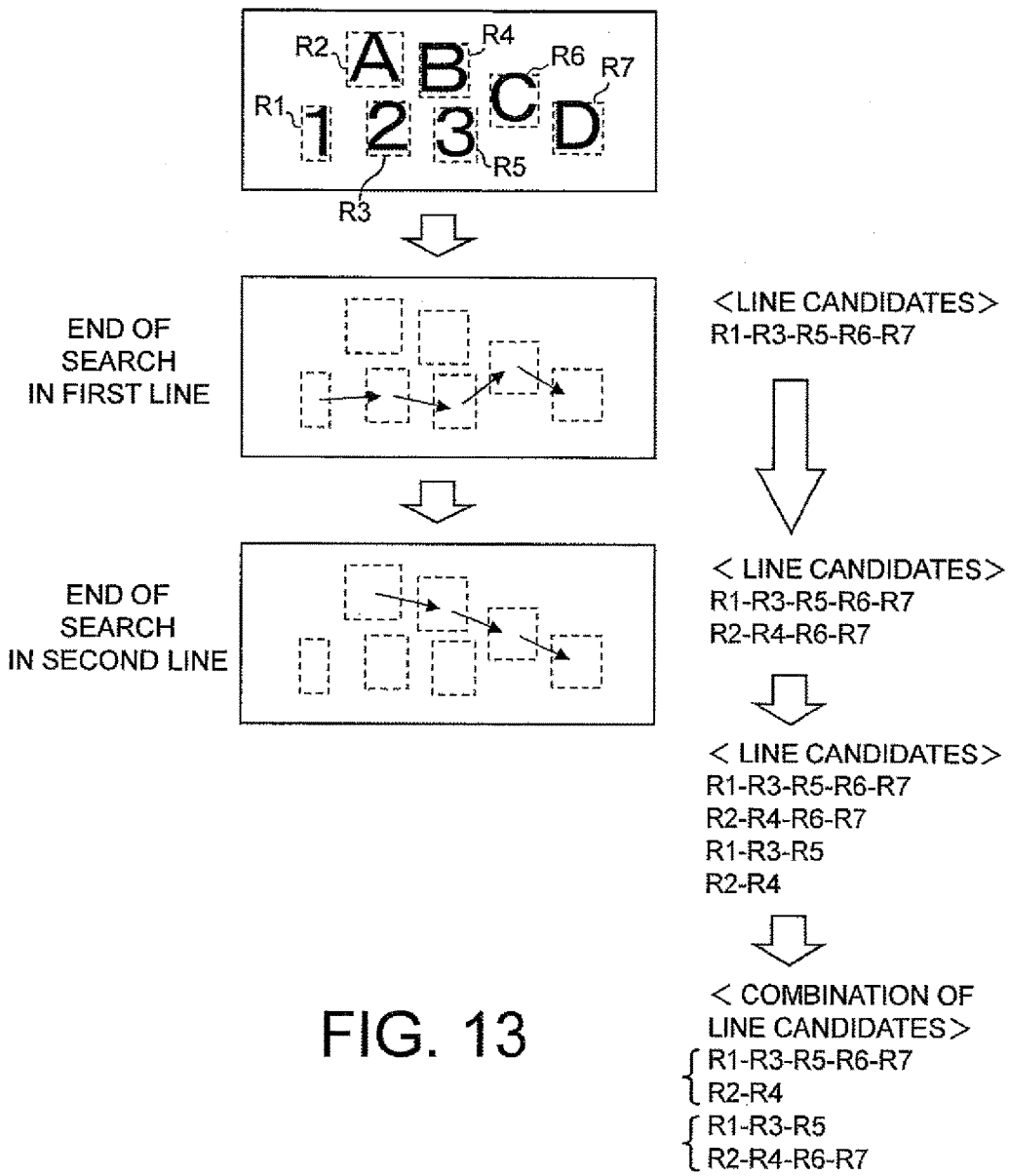
FIG. 13 is a diagram for explaining a line candidate segmentation process according to the second embodiment.

As shown in FIG. 13, a combination of character regions, "R1->R3->R5->R6->R7," is extracted as a result of searching the first line. In the subsequent search in the second line, after the character regions are linked such as "R2->R4," it is determined that a character region R6, which is already selected in the first line, satisfies the adjacency condition in relation to the character region R4. In a case where this situation arises, the line candidate segmentation unit 137 creates a line candidate for linking the character region R6 to the character region R4. As a result, two types of line candidates, "R1->R3->R5->R6->R7" and "R2->R4->R6->R7," are obtained, as shown in FIG. 13.

From these line candidates, "R1->R3->R5->R6->R7" and "R2->R4->R6->R7," the line candidate segmentation unit 137 then creates line candidates that exclude the redundant character regions, and adds these line candidates. In this example, because "R6->R7" exists redundantly, line candidates "R1->R3->R5" and "R2->R4" excluding the redundant R6->R7 are created. Then, by combining these line candidates without inconsistencies (i.e., so that the same character regions do not belong to a plurality of lines), combinations of possible line candidates are created. As a result, a combination of "R1->R3->R5->R6->R7" and "R2->R4" and a combination of "R1->R3->R5" and "R2->R4->R6->R7" are obtained as two candidates, as shown in FIG. 13. These candidates represent a variety of ways to divide a line when the linking destination of the character region R6 is changed.

Figure 14:
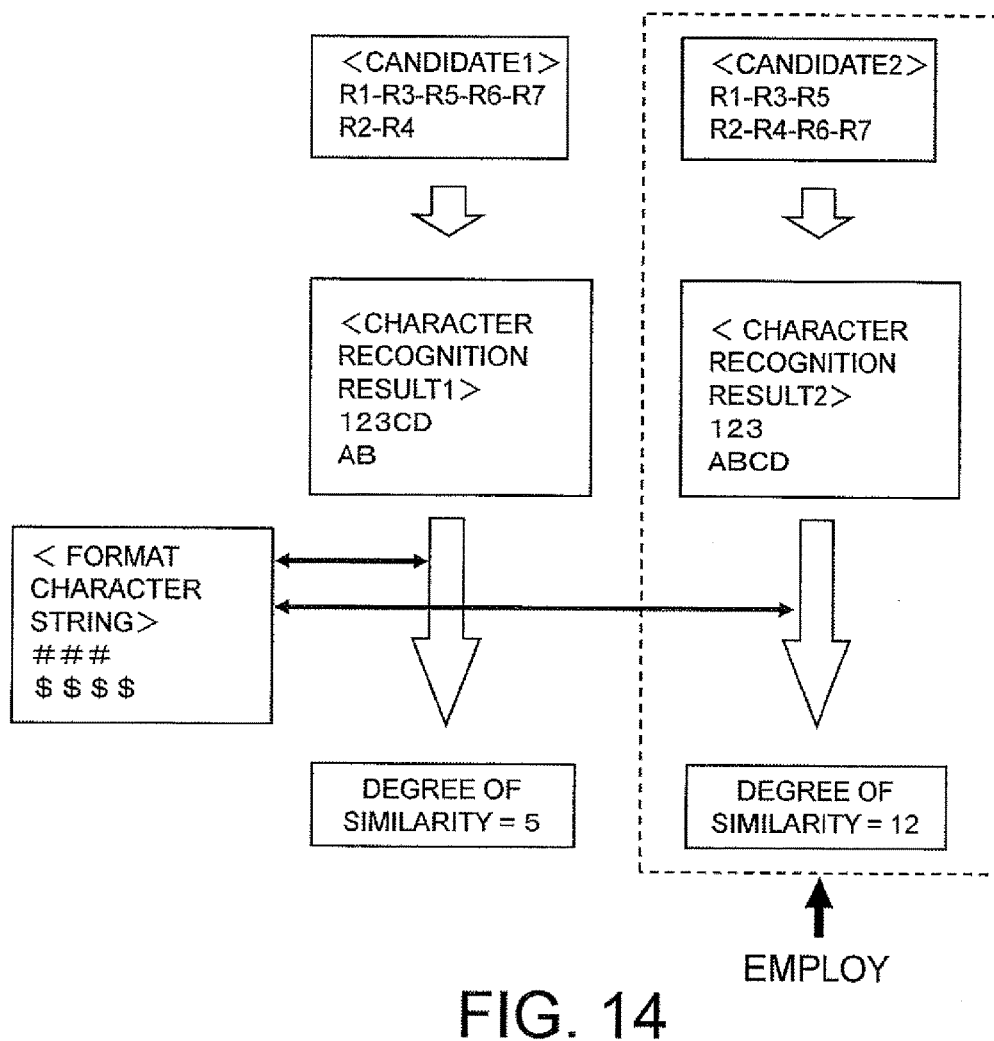
FIG. 14 is a diagram for explaining a format collation process according to the second embodiment.
Figure 15:
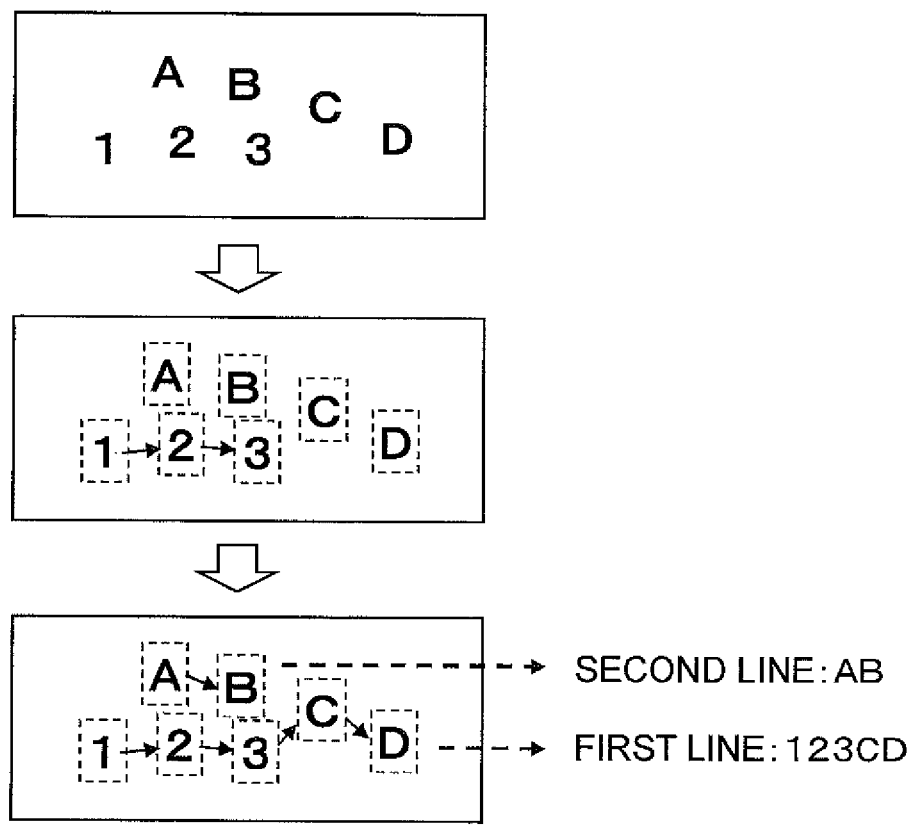
FIG. 15 is a diagram for explaining an example of erroneously determining a line.

The line candidate segmentation unit 137 delivers all the extracted candidates to the character segmentation unit 133. Then, the character segmentation unit 133 segments the characters with respect to each candidate, and the character recognition unit 134 executes character recognition with respect to the result of segmenting the characters of each candidate. FIG. 14 shows an example of a character recognition result corresponding to each of the candidates. These character recognition results are delivered to the format collation unit 139 in order to be compared with the format character string.

(Format Character String)

The format character string used in the present embodiment is for specifying the character types or characters for a character string to be recognized. In other words, the format character string is used to specify the number of characters, the character types, or a combination of characters for a character string to be recognized.

Specifically, the format character string is for specifying the character types (alphanumeric characters, alphabets, numbers, signs, special characters, Chinese characters, the hiragana characters, the katakana characters, etc.), characters themselves (each of the alphabets such as "A" and "B," each of the signs such as """ and "-,", each of the hiragana characters, each of the katakana characters, etc.), the font type, the character size (font size), and the like for a character string to be recognized. In addition to the characters, symbols may be specified using the format character string.

In the present embodiment, signs such as "?," "#," "$," and "@" are used in the format character string. The meaning of each of these signs is as follows.

?: Any character (of any character type)
: Number (0 to 9)
$: Alphabet (A to Z, a to z)
@: Sign ("," "-," ":," "¥," etc.)

These characters are merely exemplary, and therefore, the form (form of expression) of the format character string can be set up randomly.

The formats of the character strings shown in FIG. 13 can be defined as follows based on the form described above.

Character string "123" ⇔ Format character string "###."
Character string "ABCD" ⇔ Format character string "$$$$."

The user can create a format character string in accordance with a character string to be recognized and register the created format character string in the image processing apparatus 100.

(Format Collation)

The operations of the format collation unit 139 are now described with reference to FIG. 14.

As shown in FIG. 14, once the character recognition results for the plurality of candidates are obtained, the format character string acquisition unit 138 acquires the relevant format character string. Then, the format collation unit 139 computes the degree of similarity between the formats of the character strings in the character recognition result of each candidate (e.g., the alphanumeric characters, character type) and the formats of the character strings defined in the format character string. For example, the number of characters of the same character type, the degree of consistency in the number of characters in each line and the like can be used as the degree of similarity. The format collation unit 139 compares the degrees of similarity between the candidates and employs the candidate with the highest degree of similarity.

In the example shown in FIG. 14, the character recognition result of the first candidate shows "123CD" and "AB," and its degree of similarity to the format character string consisting of "### (number+number+number)" and "$$$$ (alphabet+alphabet+alphabet+alphabet)" is "5." The character recognition result of the second candidate, on the other hand, shows "123" and "ABCD," and its degree of similarity is as high as "12." Therefore, the format collation unit 139 employs the second candidate as the final line recognition result.

According to the configuration of the second embodiment described above, a candidate that best matches the format defined by the format character string is selected from among a plurality of possible candidates. For this reason, the second embodiment can achieve line recognition and character recognition that are more accurate and cause less erroneous determination compared to the first embodiment.

REFERENCE SIGNS LIST

1: Visual sensor system
2: Work
4: Photoelectronic sensor
8: Camera
100: Image processing apparatus
130: Image input unit
131: Pre-processing unit
132: Line segmentation unit
133: Character segmentation unit
134: Character recognition unit
135: Post-processing unit
136: Output unit
137: Line candidate segmentation unit
138: Format character string acquisition unit
138: Format collation unit
139: Format collation unit

The invention claimed is:

1. An image processing apparatus for character recognition, the apparatus comprising:
 a format character string acquisition unit configured to acquire a format character string that defines a format of the character string of each line;
 a character region setting unit configured to extract, from the image, character elements which are groups of pixels configuring characters, and set a plurality of character regions so as to include the character elements respectively; and
 a line recognition unit configured to divide the plurality of character regions into a plurality of lines, by executing a line extraction process for extracting a combination of character regions that are estimated to belong to the same line as a result of sequentially linking, starting from a certain character region, character regions that satisfy a predetermined adjacency condition, the line extraction process being repeatedly executed with different starting character regions,
 wherein, when there is a possibility that a third character region is redundantly selected in both a case where the line extraction process is performed starting from a first character region and a case where the line extraction process is performed starting from a second character region located in a line different from a line containing the first character region,
 the line recognition unit:
 sets, as a first candidate, a plurality of lines that are generated when incorporating the third character region into the line starting with the first character region, and as a second candidate, a plurality of lines that are generated when incorporating the third character region into the line starting with the second character region; and
 compares a degree of similarity between a format of a character string recognized from each of the lines of the first candidate and a format of a character string of each of the lines defined by the format character string, with a degree of similarity between a format of a character string recognized from each of the lines of the second candidate and the format of the character string of each of the lines defined by the format character string, and employs the candidate with the higher degree of similarity.

2. The image processing apparatus according to claim 1, wherein the format character string is information for at least defining the number of characters configuring a character string and types of some or all of the characters.

3. An image processing method for character recognition, the method comprising:
 a format character string acquisition step in which a computer acquires a format character string that defines a format of the character string of each line;
 a character region setting step in which the computer extracts, from the image, character elements which are groups of pixels configuring characters, and sets a plurality of character regions so as to include the character elements respectively; and
 a line recognition step in which the computer divides the plurality of character regions into a plurality of lines, by executing a line extraction process for extracting a combination of character regions that are estimated to belong to the same line as a result of sequentially linking, starting from a certain character region, character regions that satisfy a predetermined adjacency condition, the line extraction process being repeatedly executed with different starting character regions,
 wherein, in the line recognition step, when there is a possibility that a third character region is redundantly selected in both a case where the line extraction process is performed starting from a first character region and a case where the line extraction process is performed starting from a second character region located in a line different from a line containing the first character region,
 a plurality of lines that are generated when incorporating the third character region into the line starting with the first character region are set as a first candidate, and a plurality of lines that are generated when incorporating the third character region into the line starting with the second character region are set as a second candidate; and
 a degree of similarity between a format of a character string recognized from each of the lines of the first candidate and a format of a character string of each of the lines defined by the format character string, is compared with a degree of similarity between a format of a character string recognized from each of the lines of the second candidate and the format of the character string of each of the lines defined by the format character string, and the candidate with the higher degree of similarity is employed.

4. A non-transitory computer readable storing medium recording a computer program for causing a computer to execute each of the steps of the image processing method according to claim 3.

* * * * *